(12) United States Patent
Huang

(10) Patent No.: US 8,157,245 B2
(45) Date of Patent: Apr. 17, 2012

(54) RATCHET TIE-DOWN AND REINFORCEMENT ASSEMBLY

(76) Inventor: Han-Ching Huang, Taichung (TW)

( * ) Notice: Subject to any disclaimer, the term of this patent is extended or adjusted under 35 U.S.C. 154(b) by 372 days.

(21) Appl. No.: 12/563,224

(22) Filed: Sep. 21, 2009

(65) Prior Publication Data

US 2011/0067210 A1    Mar. 24, 2011

(51) Int. Cl.
*B21F 9/00* (2006.01)

(52) U.S. Cl. ........ 254/218; 254/223; 254/239; 254/237; 254/238; 24/70 ST; 24/69 ST; 24/69 CT

(58) Field of Classification Search ............ 254/217, 254/218, 223, 237, 238, 239; 24/70 ST, 60 ST, 24/69 CT
See application file for complete search history.

(56) References Cited

U.S. PATENT DOCUMENTS

| 4,155,537 | A | | 5/1979 | Bronson et al. | |
|---|---|---|---|---|---|
| 5,271,606 | A | * | 12/1993 | Kamper | 254/217 |
| 5,904,341 | A | * | 5/1999 | Norrby | 254/243 |
| 6,007,053 | A | * | 12/1999 | Huang | 254/247 |
| 6,547,218 | B2 | * | 4/2003 | Landy | 254/217 |
| 6,880,810 | B1 | * | 4/2005 | Hu | 254/218 |
| 7,464,915 | B2 | * | 12/2008 | Liu et al. | 254/217 |
| 7,472,890 | B2 | * | 1/2009 | Huang | 254/223 |

* cited by examiner

*Primary Examiner* — Emmanuel M Marcelo

(57) ABSTRACT

A ratchet tie-down includes a frame, a lever including two cams pivotally connected to the frame, a reeling device rotatably mounted on the frame and lever, and a ratcheting device including two ratchet wheels mounted on the reeling device. The ratchet tie-down further includes a reinforcement assembly including two reinforcement members mounted on the reeling device. Each ratchet wheel includes two lateral sides disposed between one cam and one reinforcement member. Each reinforcement member defines an annular surface in contact with one lateral side of one ratchet wheel, and with the reinforcement member imposing an urging force in a direction perpendicular to a rotation direction of the ratchet wheel.

8 Claims, 9 Drawing Sheets

RATCHET TIE-DOWN AND REINFORCEMENT ASSEMBLY

BACKGROUND OF THE INVENTION

1. Field of the Invention

The present invention relates to a ratchet tie-down and a reinforcement assembly used in connection with the ratchet tie-down.

2. Description of the Related Art

U.S. Pat. No. 4,155,537 shows a tie-down apparatus which has a strap means, a shaft means for winding and unwinding the strap means to tension the strap means, and a ratchet means which is operably engagable with the shaft means for releasably hold the shaft means against unwinding rotation during and after tensioning of the strap means. Further, the apparatus includes a base member, and the ratchet means includes a ratchet wheel and a retainer securing the ratchet wheel to a lateral side of the base member.

As should be appreciated, this retainer would not apply a retaining force on the ratchet wheel in a manner to prevent the ratchet wheel from wobbling on the shaft means undesirably.

The present invention is therefore intended to obviate or at least alleviate the problems encountered in the prior art.

SUMMARY OF THE INVENTION

According to the present invention, a ratchet tie-down includes a frame, a lever including two cams pivotally connected to the frame, a reeling device rotatably mounted on the frame and lever, and a ratcheting device including two ratchet wheels mounted on the reeling device. The ratchet tie-down further includes a reinforcement assembly including two reinforcement members mounted on the reeling device. Each ratchet wheel includes two lateral sides disposed between one cam and one reinforcement member. Each reinforcement member defines an annular surface in contact with one lateral side of one ratchet wheel, and imposes an urging force in a direction perpendicular to a rotation direction of the ratchet wheel in order to prevent the ratchet wheel from wobbling.

The ratchet tie-down further includes a first pawl movably installed on the frame and being moveable between an operative position in engagement with the ratchet wheels and an idle position away from the ratchet wheels;

The ratchet tie-down further includes a second pawl movably installed on the lever and being moveable between an operative position in engagement with the ratchet wheels in order to rotate the reeling device and an idle position away from the ratchet wheels.

It is a primary object of the present invention that the ratchet wheels are prevented from wobbling.

Other objects, advantages, and new features of the present invention will become apparent from the following detailed description of the invention when considered in conjunction with the accompanied drawings

DETAILED DESCRIPTION OF THE PREFERRED EMBODIMENT

Figure 1:
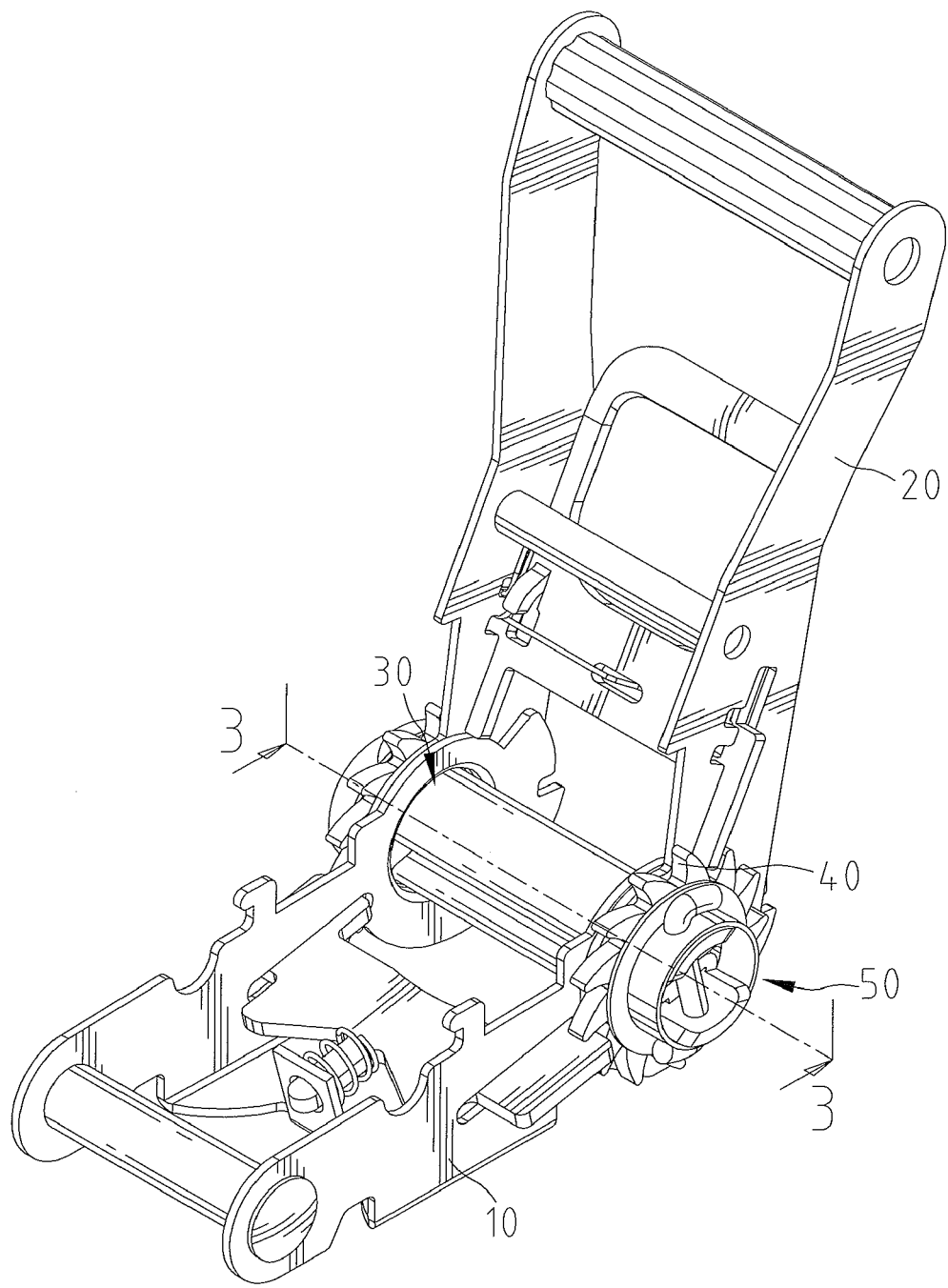
FIG. 1 is a perspective view of a ratchet tie-down in accordance with a first embodiment of the present invention.

FIGS. 1 through 7 show a ratchet tie-down in accordance with a first embodiment of the present invention. User can use the ratchet tie-down to tension a strap. The ratchet tie-down includes a frame 10, a lever 20, a reeling device 30 received by the frame 10 and the lever 20, a ratcheting device 40 and a reinforcement assembly 50 both connected to the reeling device 30.

The frame 10 includes two walls of the same configuration. Each wall includes an arched edge 101 and a hole 102. The arched edge 101 defines first and second arched edge sections being adjacent to one another, and the second arched edge section has a longer radius with respect to a center of the hole 102 than the first arched edge section, The hole 102 extends through the wall. Additionally, the second arched edge section includes a slot 103 defined therein. Further, each wall has an exterior side including a flange 104 which extends outwardly therefrom, and the flange 104 extends annularly about the hole 102. The frame 10 further includes an axle 11 extending transversely to and between interior sides of the walls. The axle 11 is adapted to hook to an anchor point by itself or by means of a strap connected thereto. The frame 10 further includes a first pawl 12 movably installed thereon, and the first pawl 12 includes two engaging sections 121 extending through the two walls, respectively.

The lever 20 includes two cams of the same configuration. Each cam includes a hole 201 and a cam section 202 at a first end thereof. The hole 201 extends through the cam and is inserted by one flange 104. Specifically, the hole 201 delimits a perimeter corresponding to a perimeter of the flange 104 and has a size marginally larger than a size of the flange 104 in order for the flange 104 to insert through the hole 201. The cam section 202 delimits an eccentric perimeter with respect to a center of the hole 201 and is utilized to selectively urge the first pawl 12. The lever 20 further includes a grip 21 extending transversely to and between interior sides of the cams. Additionally, the grip 21 is connected between second ends of the cams. The lever 20 further includes a second pawl 22 movably installed thereon. Specifically, each cam includes a slot 203 and a boss 204, and the second pawl 22 includes an aperture 223 defined therein, and an elastic element 23 includes a loop and two legs extending therefrom, and the loop is inserted by the boss 204 of one cam, and one leg is rested on the one cam while the other leg is rested on the second pawl 22. Additionally, the second pawl 22 includes two engaging sections 221 extending through the two cams, respectively, and the engaging sections 221 are movable from the first arched edge section to the second arched edge section and engage in the two slots 103, respectively. Moreover, the second pawl 22 includes a pulling section 222 for facilitating user to operate the second pawl 22. Preferably, the pulling section 22 includes a through hole and user can insert his fingers to grip the pulling section 222.

The reeling device 30 includes a spool 31 which can receive a strap to be tensioned. Preferably, the strap is inserted through a slot defined by the spool 31. Preferably, the spool 31 includes first and second spool members connected to one another. The spool 31 is rotatably mounted on the frame 10 and lever 20. Additionally, the spool 31 is inserted through the holes 102 of the frame 10 and holes 201 of the lever 20 and includes a proximal end exposed from one cam and a distal end exposed from the other cam. The spool 31 further includes two engaging sections 311 defined on the respective proximal and distal ends.

The ratcheting device 40 includes two ratchet wheels 41 mounted on and being rotatable with the spool 31. Additionally, one ratchet wheel 41 is mounted on one engaging section 311 of the spool 31 and is disposed outside one wall of the frame 10 and one cam of the lever 20. Likewise, another ratchet wheel 41 is mounted on the other engaging section 311 of the spool 31 and is disposed outside the other wall of the frame 10 and the other cam of the lever 20. Thus, each cam of the lever 20 is disposed between the frame 10 and ratchet wheel 41.

Figure 2:
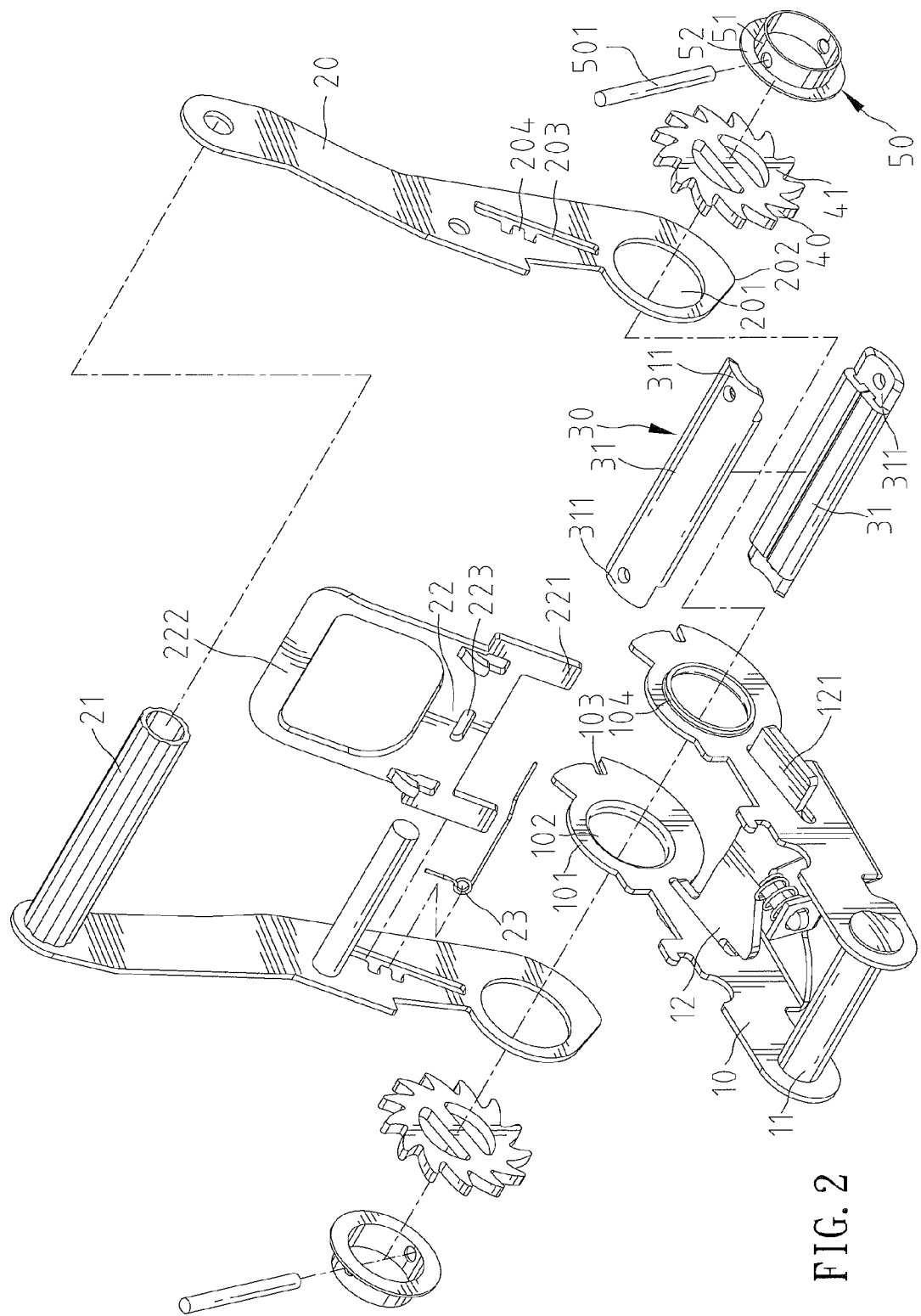
FIG. 2 is an exploded perspective view of the ratchet tie-down of FIG. 1.
Figure 3:
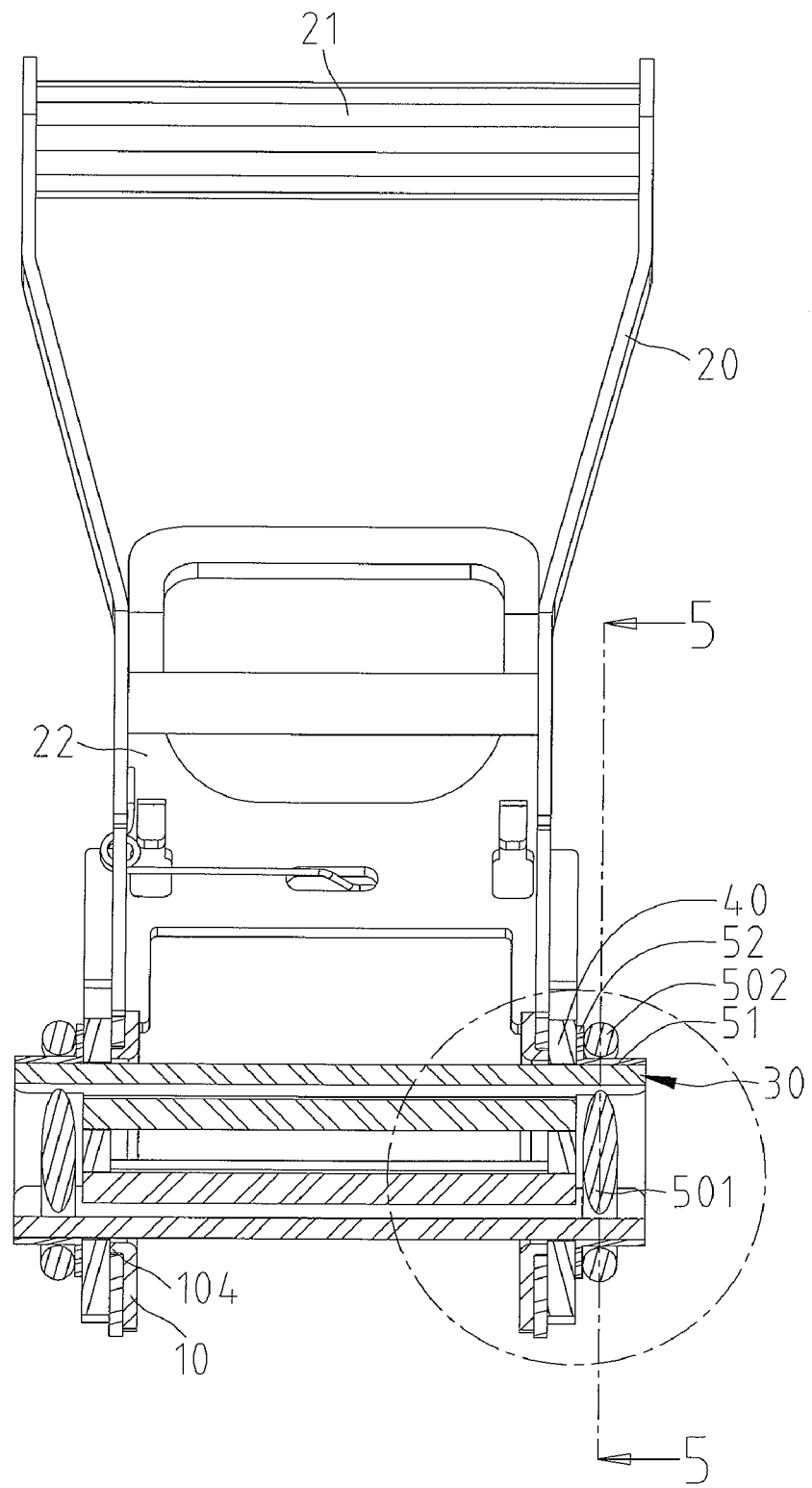
FIG. 3 is a cross-sectional view taken along line 3-3 of FIG. 1.
Figure 4:
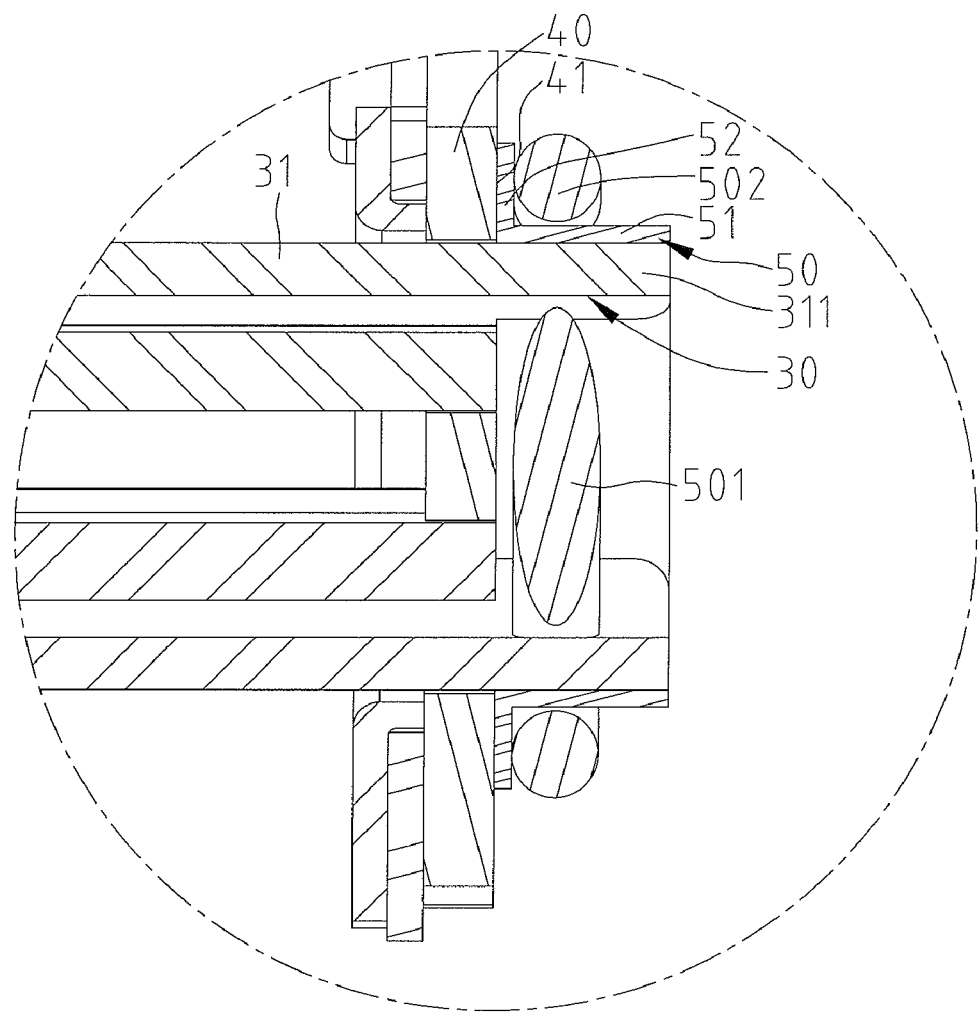
FIG. 4 is a partial, enlarged view of FIG. 3.
Figure 5:
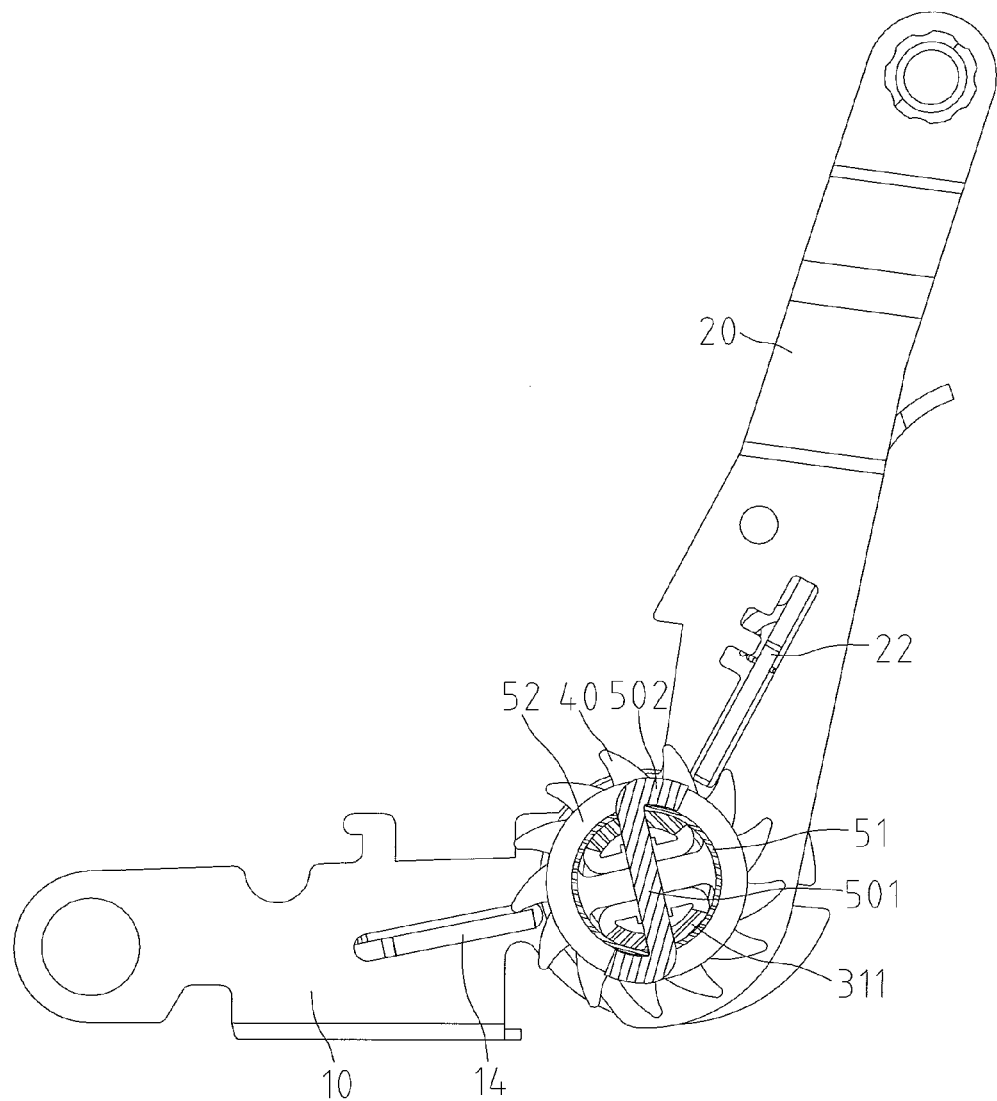
FIG. 5 is a cross-sectional view taken along line 5-5 of FIG. 3.
Figure 6:
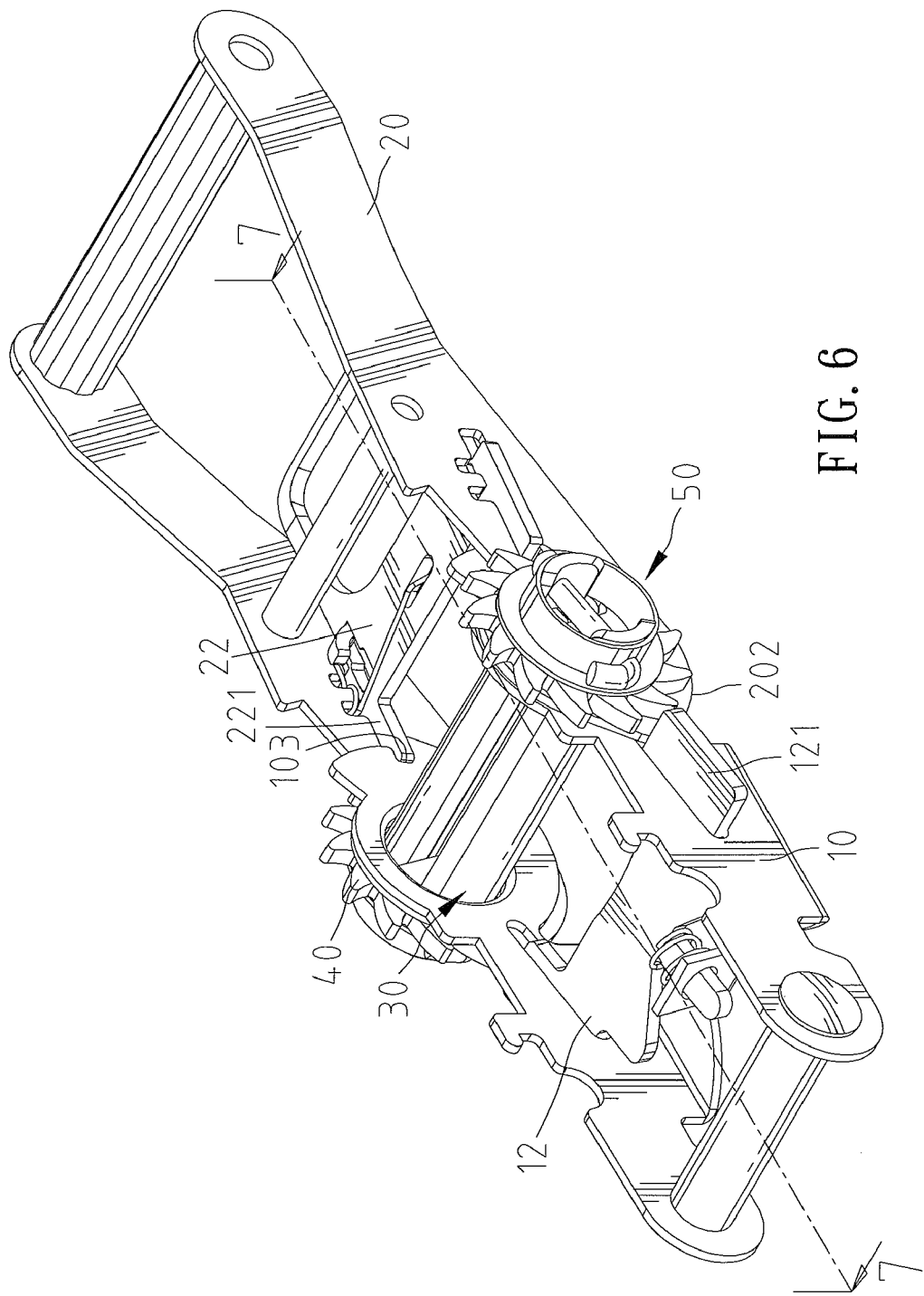
FIG. 6 is a perspective view of the ratchet tie-down in a position in which a ratcheting device is disengaged from a lever.
Figure 7:
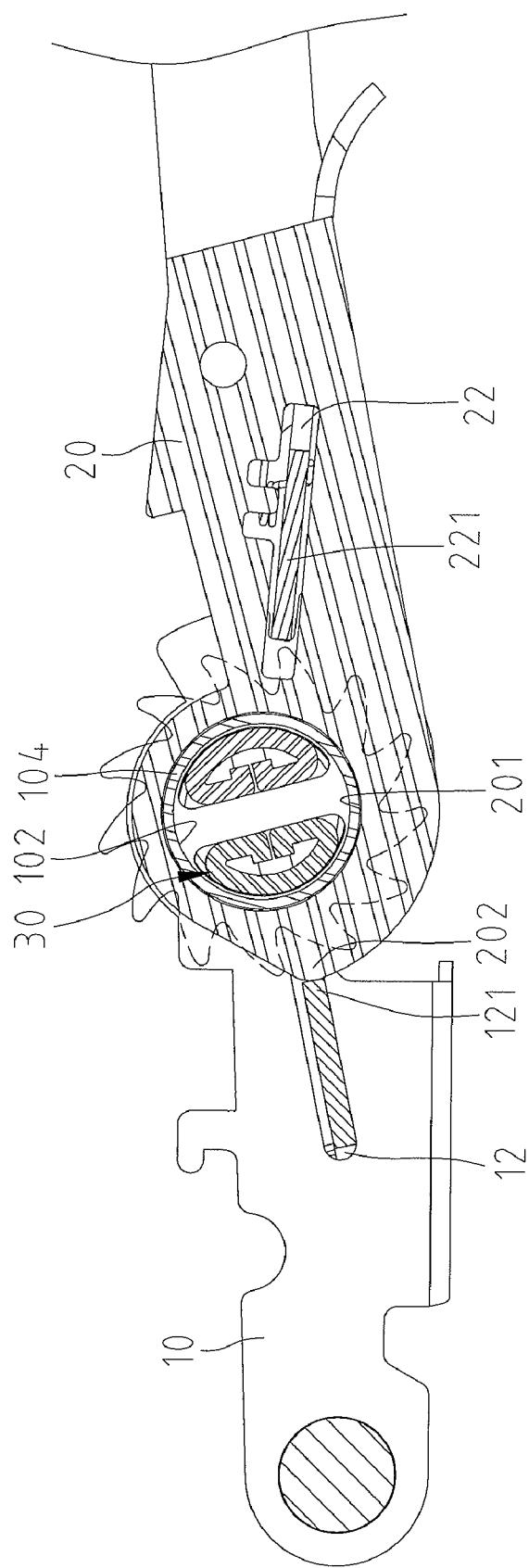
FIG. 7 is a cross-sectional view taken along line 7-7 of FIG. 6.

The reinforcement assembly 50 includes two reinforcement members 51 mounted on and being rotatable with the spool 31. Specifically, each reinforcement member 51 is in the shape of a tube with two openings, and the proximal end of the spool 31 inserts in one reinforcement member 51 while the distal end of the spool 31 inserts in the other reinforcement member 51, and one of two retainers 501 inserts through a peripheral edge of one reinforcement member 51 and the proximal end of the spool 31 while the other inserts through a peripheral edge of the other reinforcement member 51 and the distal end of the spool 31. FIG. 2 shows the retainers 501 is straight, and the retainers 501 are fabricated with two bends to prevent disengagement from the spool 31, as best shown in FIG. 5. Each reinforcement member 51 defines an annular surface in contact with a lateral side of one ratchet wheel 41, and the reinforcement member 51 imposes an urging force in a direction perpendicular to a rotation direction of the ratchet wheel 41 in order to evenly impose an urging force to prevent the ratchet wheel 41 from wobbling, as described in the Description of the Related Art. Each reinforcement member 51 further includes a ridge 52 extending radially from and annually around its peripheral edge, and the ridge 52 also defines an annular surface in contact with the same lateral side of one ratchet wheel 41 to increase a surface contact on the ratchet wheel 41 in order to increase its ability to prevent the ratchet wheel 41 from wobbling. Additionally, each ratchet wheel 41 includes two lateral sides disposed between one cam and one reinforcement member 51.

In use of the ratchet tie-down, the first pawl 12 can be moved between an operative position in engagement with the ratchet wheels 41 and an idle position away from the ratchet wheels 41. Specifically, the two engaging sections 121 engage with the two ratchet wheels 41 respectively when the first pawl 12 is in the operative position, and the two engaging sections 121 disengage from the two ratchet wheels 41 respectively when the first pawl 12 is in the idle position. In addition, the second pawl 22 can be moved between an operative position in engagement with the ratchet wheels 41 in order to rotate the spool 31 and an idle position away from the ratchet wheels. Specifically, the two engaging sections 221 engage with the two ratchet wheels 41 respectively when the second pawl 22 is in the operative position, and the two engaging sections 221 disengage from the two ratchet wheels 41 respectively and engage in the two slots 103 when the second pawl 22 is in the idle position.

Figure 8:
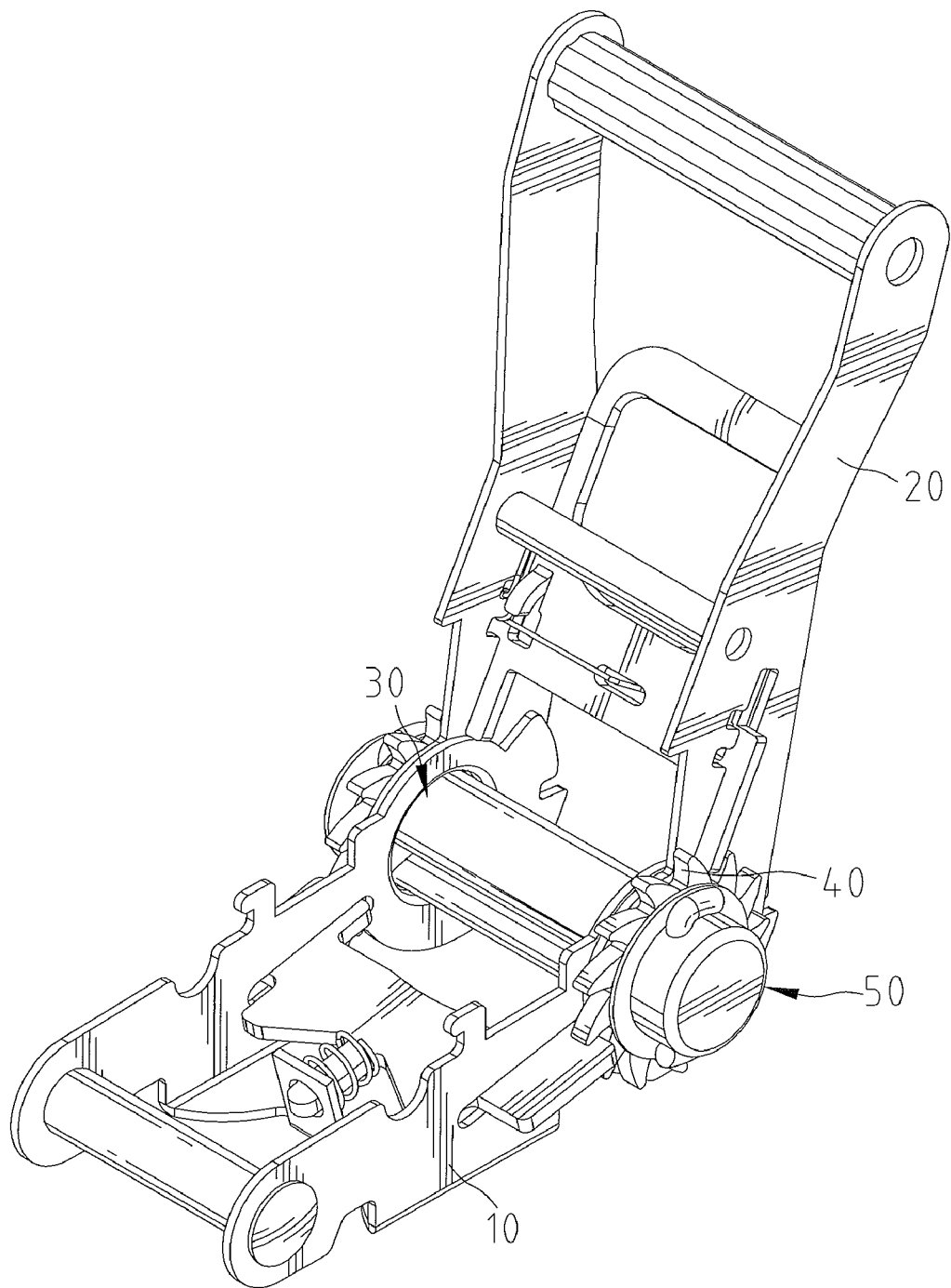
FIG. 8 is a perspective view of a ratchet tie-down in accordance with a second embodiment of the present invention.
Figure 9:
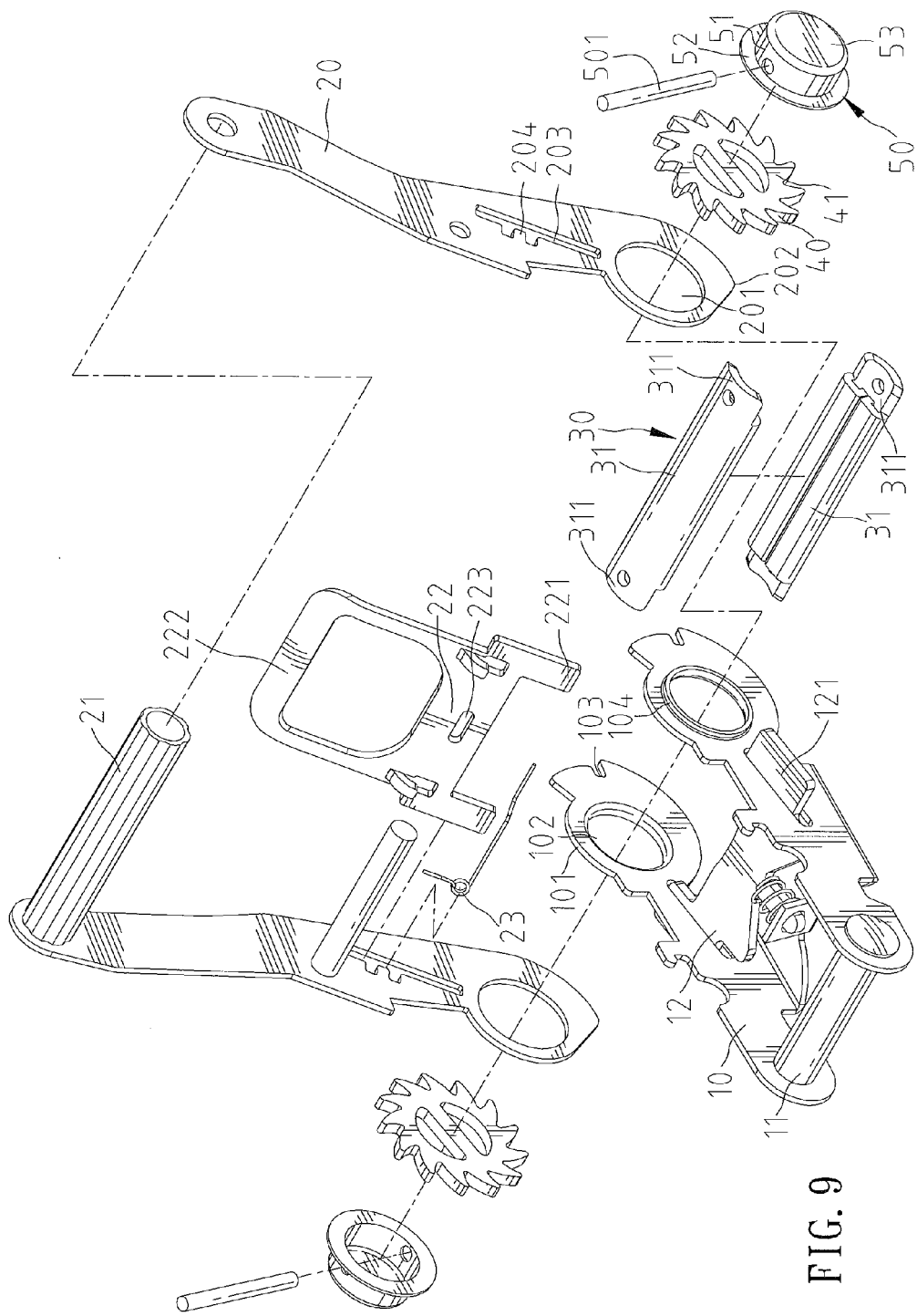
FIG. 9 is an exploded perspective view of the ratchet tie-down of FIG. 8.

FIGS. 8 and 9 show a ratchet tie-down in accordance with a second embodiment of the present invention. The second embodiment is similar to the first embodiment except that each reinforcement member 50 includes a cap section 53 closing one of its openings in order to improve structure thereof as well as prevent dirt accumulation and for aesthetic reason.

In view of forgoing, it is therefore an object of the present invention that the ratchet wheels 41 are prevented from wobbling.

It is another object of the present invention that the cams of the lever 20 are prevented from imposing frictional forces on the spool 31. Thus, it is easy to pivot the lever 20.

While the specific embodiments have been illustrated and described, numerous modifications come to mind without significantly departing from the spirit of invention and the scope of invention is only limited by the scope of accompanying claims.

What is claimed is:

1. A ratchet tie-down comprising:
a frame including two walls;
a lever including two cams pivotally connected to the two walls of the frame respectively;
a reeling device rotatably mounted on the frame and lever;
a ratcheting device including two ratchet wheels mounted on proximal and distal ends of the reeling device respectively and being rotatable therewith;
a reinforcement assembly including two reinforcement members mounted on the proximal and distal ends of the reeling device respectively and being rotatable therewith;
a first pawl movably installed on the frame and being moveable between an operative position in engagement with the ratchet wheels and an idle position away from the ratchet wheels;
a second pawl movably installed on the lever and being moveable between an operative position in engagement with the ratchet wheels in order to rotate the reeling device and an idle position away from the ratchet wheels; and wherein each ratchet wheel includes two lateral sides disposed between one cam and one reinforcement member; and
wherein each reinforcement member defines an annular surface in contact with one lateral side of one ratchet wheel, and with the reinforcement member imposing an urging force in a direction perpendicular to a rotation direction of the ratchet wheel, wherein each of the walls of the frame includes a flange extending outwardly from an external side, wherein each of the cams of the lever includes a second hole for receiving the flange.

2. The ratchet tie-down as claimed in claim 1 wherein each wall of the frame includes an arched edge and a first hole, with the arched edge defining first and second arched edge sections being adjacent to one another, and with the second arched edge section has a longer radius with respect to a center of the first hole than the first arched edge section, wherein the second pawl is movable from the first arched edge section to the second arched edge section, and wherein one end of the reeling device inserts through the hole.

3. The ratchet tie-down as claimed in claim 1 wherein the second hole delimits a perimeter corresponding to a perimeter of the flange and has a size marginally larger than a size of the flange in order for the flange to insert through the second hole.

4. The ratchet tie-down as claimed in claim 1 wherein each reinforcement member is in the shape of a tube with two openings.

5. The ratchet tie-down as claimed in claim 4 wherein each reinforcement member includes a cap section closing one of its openings.

6. The ratchet tie-down as claimed in claim 1 wherein each cam of the lever includes a cam section selectively urging the first pawl, and with the cam section delimits an eccentric perimeter with respect to a center of the second hole.

7. The ratchet tie-down as claimed in claim 1 including an elastic element formed with a loop and two legs extending from the loop, wherein each cam of the lever includes a slot and a boss, wherein the second pawl includes an aperture defined therein, and wherein the elastic element is provided between the cam and second pawl is provided around the boss, and leg one of the lees is rested on the cam while the other leg is rested on the second pawl.

8. The ratchet tie-down as claimed in claim 1 wherein each reinforcement member includes a ridge extending radially and annually around a peripheral edge thereof, and with the ridge defines an annular surface in contact with one lateral side of one lateral side of one ratchet wheel.

\* \* \* \* \*